(No Model.)

M. W. KIDDER.
APPARATUS FOR GENERATING ACETYLENE GAS.

No. 576,585. Patented Feb. 9, 1897.

WITNESSES.
A. D. Harrison.
A. D. Adams.

INVENTOR:
M. W. Kidder
by Wright Brown & Quinby
attys.

THE NORRIS PETERS CO., PHOTO-LITHO., WASHINGTON, D. C.

UNITED STATES PATENT OFFICE.

MOSES W. KIDDER, OF LINCOLN, MASSACHUSETTS, ASSIGNOR TO PERSON NOYES, OF LOWELL, MASSACHUSETTS.

APPARATUS FOR GENERATING ACETYLENE GAS.

SPECIFICATION forming part of Letters Patent No. 576,585, dated February 9, 1897.

Application filed February 1, 1896. Serial No. 577,719. (No model.)

*To all whom it may concern:*

Be it known that I, MOSES W. KIDDER, of Lincoln, in the county of Middlesex and State of Massachusetts, have invented certain new and useful Improvements in Apparatus for Generating, Storing, and Regulating Acetylene Gas from Calcic Carbid, of which the following is a specification.

This invention has for its object to provide apparatus for the safe generation, storage, and regulation of acetylene gas as obtained from calcic carbid and water by their mutual exchange of the elements of their composition.

The invention consists in the improvements hereinafter described relating to the generation and storage of acetylene gas whereby the contact of the water with the calcic carbid is automatically determined by the pressure of the gas generated during the period of such contact, the water being alternately displaced and expelled from contact with the calcic carbid as the gas-pressure increases and allowed to return to the storage-space containing the calcic carbid as the gas-pressure decreases.

The invention also consists in certain additional improvements incidental to the general purposes of my invention, all of which I will now proceed to describe and claim.

Figure 1:
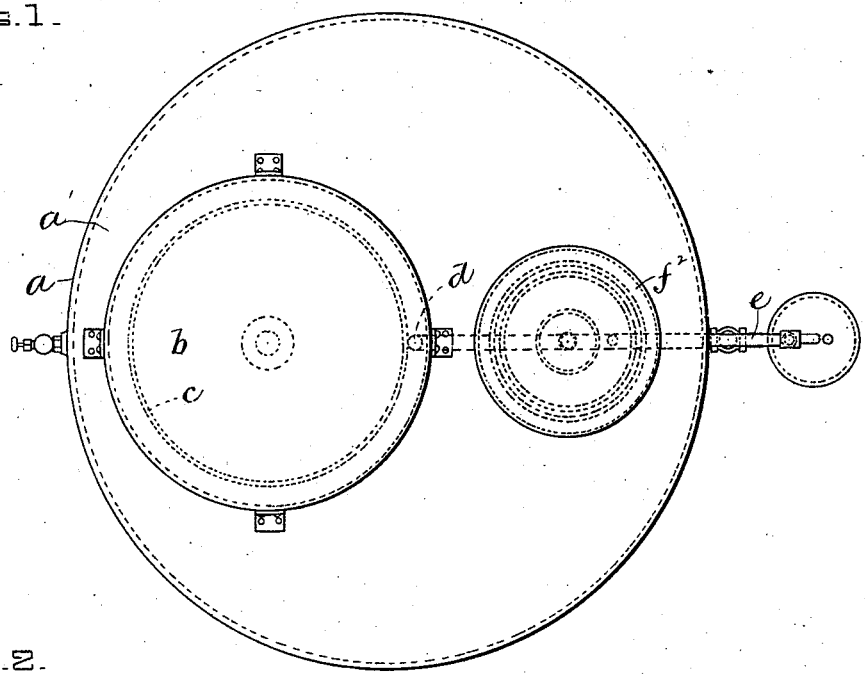
Figure 2:
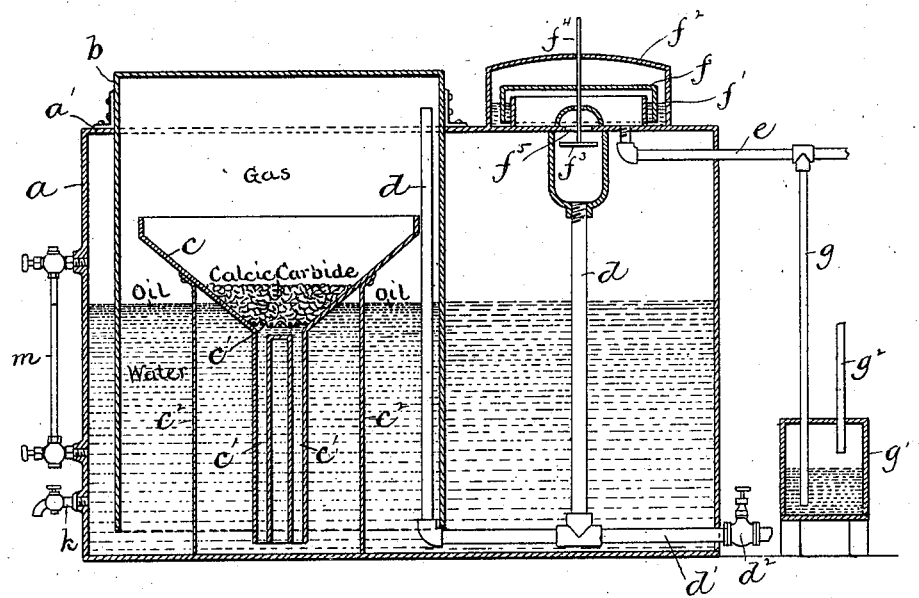

Of the accompanying drawings, forming a part of this specification, Figure 1 represents a top view of an apparatus embodying my invention. Fig. 2 represents a section on line 2 2 of Fig. 1.

The same letters of reference indicate the same parts in both figures.

In the drawings, $a$ represents a cylindrical tank adapted to contain water and provided with a top or cover $a'$.

$b$ represents a gas-receptacle which is an inverted cup or cylinder closed at its upper end and open at its lower end, the closed upper end being here shown as projecting through the top or cover of the cylindrical tank $a$, the latter having an opening to receive the gas-receptacle $b$.

$c$ represents a receptacle for the calcic carbid, said receptacle being preferably made in the form of a funnel and having provisions at its lower portion for the admission of water from the water-receptacle, which is the lower part of the tank $a$, into the storage-space which contains the calcium carbid.

I have here shown the calcium-carbid receptacle $c$ as provided with a reticulated bottom $c'$, which supports the carbid above it and permits the water to pass upwardly through it into contact with the carbid, the receptacle $c$ being provided below said bottom with one or more water-inlets. I have here shown two water-inlets $c'$ $c'$, each being an elongated tube extended downwardly from the lower portion of the receptacle $c$ nearly to the bottom of the water-receptacle, the object of said elongated tubes being to prevent the entrance of oil into the storage-space of the receptacle $c$, as hereinafter explained.

The receptacle $c$ is here shown as supported by legs $c^2$ from the bottom of the tank, the said receptacle being located within the gas-receptacle, or, in other words, interposed between the water and the gas receptacles, its arrangement being such that its lower portion receives water from the water-receptacle, while its upper portion discharges gas into the gas-receptacle.

$d$ represents a pipe which extends from the upper portion of the gas-receptacle downwardly under the gas-receptacle and laterally therefrom and upwardly to the upper portion of the tank $a$, its upper end communicating with the gas-outlet pipe $e$. To insure the maintenance of the proper degree of pressure in the gas-outlet pipe and in the distributing-pipes connected therewith, I provide a gas-pressure regulator, which regulates the passage of gas from the pipe $d$ to the outlet-pipe $e$. Said regulator may be of any suitable construction. As here shown, it comprises an inverted floating cup $f$, which is immersed in a suitable sealing medium contained in an annular space $f'$ under a dome $f^2$, and a valve $f^3$, connected by a rod $f^4$ with the cup $f$, said valve being movable toward and from an opening $f^5$, through which the gas passes from the pipe $d$ into the interior of the cup $f$, the valve $f^3$ being adapted to close said opening when the cup $f$ is sufficiently elevated. The outlet-pipe $e$ communicates with the interior of the cup $f$. It will be seen, therefore, that as the pressure increases in the outlet-pipe $e$ and the distributing-pipes connected therewith the cup $f$ is raised and contracts the opening through which gas passes from the pipe $d$, thus reducing the pressure, the cup $f$ descending when the pressure in the outlet-pipe decreases, thus affording a larger opening for the entrance of gas into the outlet-pipe. I do not limit myself, however, to this construction of pressure-regulator, and may use any other suitably-constructed pressure-regulator.

Any suitable fluid may be used to seal the inverted cup $f$ in the annular space $f'$, chlorid of zinc or chlorid of calcium being suitable fluids. Mercury, however, should be avoided, because it is liable to combine with the acetylene gas, forming a fulminate of mercury.

$d'$ represents an outlet-pipe extending from the pipe $d$ outside the tank $a$ for the escape of any liquid that may accumulate in the pipe $d$, said outlet-pipe having a cock $d^2$.

To prevent the sealing fluid from being blown out of the annular space $f''$ by the gas-pressure, I provide a safety appliance which, as here shown, comprises a pipe $g$, connected with the outlet-pipe $e$, a receptacle $g'$, into which the pipe $g$ extends nearly to the bottom, said receptacle containing a body of any suitable liquid, into which the lower end of the pipe $g$ extends, and an outlet-pipe $g^2$, extending from the receptacle $g'$ above the body of liquid. The liquid in the receptacle $g'$ seals the pipe $g$ and prevents the passage of gas through it under ordinary pressures, but permits the escape of gas when the pressure becomes greater than normal.

In operating the described apparatus water is introduced into the tank $a$ until it rises above the lower ends of the elongated inlet-pipe $c'$. A film of oil is then introduced into the tank to cover the water and prevent its evaporation and the absorption of its vapor by the calcic carbid. More water is then admitted into the tank until the accumulation rises and enters the lower portion of the calcic-carbid receptacle $c$, the water rising through the elongated inlets $c'$, which prevent the admission of the oil to the receptacle $c$ because their lower ends are below the film of oil. The contact of the water with the calcic carbid immediately produces acetylene gas, which accumulates in the gas-receptacle, its pressure increasing until it depresses the water within the gas-receptacle, the displaced water rising in the portions of the tank $a$ surrounding the gas-receptacle, the water being thus expelled from the storage-space of the calcic-carbid receptacle, whereupon the generation of gas ceases, the pressure of gas in the gas-holder being decreased as the gas is drawn therefrom through the pipe $d$, so that the water again rises into contact with the calcic carbid, thus producing another supply of gas, this operation continuing as long as the gas escapes through the outlet $e$, the pressure of the gas in the gas-receptacle automatically controlling the contact of water with the calcic carbid. I therefore avoid any excessive pressure of the acetylene gas and insure a supply proportionate only to the demand.

$k$ represents an outlet-pipe by which the water may be drawn from the lower portion of the tank, and $m$ represents a gage-tube whereby the height of water in the tank may be ascertained.

I claim—

A gas generating and storing apparatus comprising a water-receptacle, a gas-receptacle whose walls extend within the water-receptacle in proximity to the base thereof, said gas-receptacle being closed at the top and open at the bottom for water communication, an intermediate calcic-carbid receptacle within the gas-receptacle communicating at one side with the gas-space thereof, and a water-inlet conduit projecting downwardly from another side of the said calcic-carbid receptacle to the lower portion of the water-receptacle, said inlet also serving as a guard to prevent the admission to the said calcic-carbid receptacle of oil floating on the water in the gas-receptacle.

In testimony whereof I have signed my name to this specification, in the presence of two subscribing witnesses, this 27th day of January, A. D. 1896.

MOSES W. KIDDER.

Witnesses:
A. D. HARRISON,
A. D. ADAMS.